March 7, 1961    L. F. MUCCINO    2,973,800
METHODS OF COVERING GOLF BALLS
Filed Sept. 2, 1958

INVENTOR.
Louis F. Muccino
BY
Emery, Whittemore, Sandoe & Dix
ATTORNEYS 2,973,800
Patented Mar. 7, 1961

2,973,800
METHODS OF COVERING GOLF BALLS
Louis F. Muccino, Blindbrook Lodge, Rye, N.Y.

Filed Sept. 2, 1958, Ser. No. 758,592

8 Claims. (Cl. 154—17)

This invention relates to methods of covering golf balls.

Golf balls, as currently manufactured, sold and used usually comprise a central, spherical core on which a layer of rubber strand, either thread or tape, is wound under tension. The resulting wound core is usually referred to as a "center," and is also spherical in shape. The ball is completed by applying a cover to the center.

From the early days of the game of golf, balata and gutta percha have been the preferred materials for use in golf ball covers. Such materials are thermoplastic and are easily molded by application of heat and pressure, and even if used in unvulcanized condition are reasonably tough and resistant to damage. As the science of rubber technology has advanced, and as the demand of golf players for better covers have been made known, various improvements have been made. In some cases balata has been compounded with gutta percha, and in other cases balata or gutta percha or mixtures of the two have been compounded with rubber or various other ingredients believed to improve the characteristics of the cover stock. In order to increase the toughness of the cover stock, it is now common practice to vulcanize or cure the covers, and improvements have also been made from time to time in vulcanizing and accelerating agents and in processes or procedures for vulcanizing or curing the covers.

In all cases, however, regardless of the nature of the cover stock, the method of applying the cover to the center has been substantially similar. That is, the selected cover stock has been warmed and molded to form hollow elliptical cups. The inside diameter of the cups has been somewhat less than the outside diameter of the center and the outside diameter of the cups has been somewhat less than the outside diameter of a finished ball. Two such cups have then been pressed onto opposite sides of a center, but without bringing the edges of the cups into contact. The assembled center and cups have then been placed between the hemispherical cavities of a mold which has then been placed in a hot plate press. As the cover stock was heated and softened by the heat of the mold, the mold parts were gradually brought together by the press to apply heat and pressure to cause the cover stock to flow. In doing so, the softened cover stock was forced into the interstices between the outer windings of the center and caused to adhere thereto. At the same time, the usual shallow depressions, commonly known as "dimples," have been formed in the outer surface of the cover by suitable protrusions projecting outwardly from the surfaces of the mold cavity.

The prolonged exposure to heat (temperatures in the region of 220° F. are commonly used) required to mold the cover stock onto the center and to vulcanize or partially vulcanize the cover has long been known to have a deleterious effect on the rubber windings of the center. It frequently causes breakage of the tensioned rubber strands, causes non-uniform compression, and is a serious source of rejects in the manufacturing process. Therefore, in order to reduce the duration of exposure to heat, the cover stock has been compounded with accelerators or with vulcanizing ingredients which are effective to produce vulcanization at normal room temperatures. In the Geer Patent No. 1,524,428, for example, it was proposed to compound balata with an accelerator in order to reduce the exposure to heat to a total of six minutes, i.e. a three minute preliminary heating in the partly closed mold, and then a further heating under pressure for three minutes. After the covered balls are removed from the mold, they are allowed to "air-cure" at ordinary temperature for four to seven days. The method of the Geer patent has been widely used in the manufacture of golf balls for many years.

The Caldwell Patent No. 1,777,960 describes another method of vulcanization of rubber which has also been widely used in the covering of golf balls with balata or gutta percha. However, while the Caldwell method, in its broad aspects, provides for vulcanization at normal room temperatures, its application to the covering of golf balls has always been in connection with an initial exposure of the ball to heat and pressure as previously described in order to induce flow of the thermoplastic material and to cause adhesion of the cover to the center. Again, as in the Geer method, after removal of the covered balls from the heated mold, vulcanization or curing was allowed to proceed at normal room temperatures for the period required to effect a complete cure.

A preferred embodiment of the invention is shown in the accompanying drawings, in which.

Figure 2:
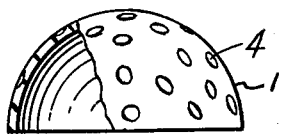
Figures 2 and 3 are front elevations, partly in section, of the hemispherical cover shells.
Figure 1:
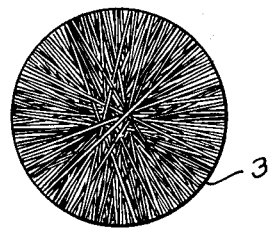
Figure 1 is a front elevation of a golf ball center.
Figure 3:
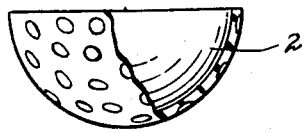

According to the present invention, I first form two hollow hemispherical shells 1 and 2 preferably by subjecting a suitable thermoplastic material to heat and pressure in a suitable mold, but instead of forming them of a diameter less than the outside diameter of the center 3 according to the present practice, I form them to accurate shape and finished dimensions, i.e. the outside diameter of each shell 1, 2 is substantially equal to the desired outside diameter of the covered ball, and the inside diameter of each shell is substantially equal to the outside diameter of the center 3 to which it is to be applied. Moreover, I preferably form the said shells in a mold adapted to form a multiplicity of shallow depressions 4, i.e. the usual "dimples," in the outer surface of each shell. Thus, the hemispherical shells, as so formed, are completely formed and ready for application to a center, in the manner hereinafter described, without any further plastic deformation of any kind. Alternatively, however, the said shells may be formed without forming such depressions in the outer surface thereof. In such case, the depressions may be formed in the outer surfaces of the shells after the shells have been applied to the center.

The method of the invention is particularly applicable to balata and gutta percha and to a large number of thermoplastic materials having characteristics similar to or in some cases superior to those of balata and gutta percha. For example, I have used the method of the invention successfully in covering golf balls with urethane polymers cured by use of proper curing agents and techniques as recommended by the manufacturers. Such urethane polymers may be cured by reacting them with diamines, polyols, moisture or catalysts in accordance with known procedures. Such urethane polymers, when properly cured, form an extremely tough, durable cover which is more resistant to cutting by impact with a golf club than the best gutta percha or balata covers. Other synthetic resins such as polyvinyl chloride, vinylidene chloride and the like may also be used by the present method.

The hemispherical shells may be either partially or completely vulcanized or cured before being applied to the center as hereinafter described. That is, in the case of balata or gutta percha, for example, the shells may be completely vulcanized in the mold, if desired, or they may be partially vulcanized, and the vulcanization or curing may be completed either before or after the shells are applied to the centers. Likewise, in the case of urethane polymers the shells may be either partially or completely cured before being applied to the centers.

The hemispherical shells so formed are secured to the center by adhesion, using any suitable adhesive which will form a tight adhesive bond to the rubber strands of the center and to the selected cover stock, and which remains flexible when dried or set. There are many suitable adhesives available commercially which have been found satisfactory, such as fast drying liquid synthetic rubber based cements or liquid polymerized epoxy resins. For example, I have used successfully adhesives manufactured by Minnesota Mining and Manufacturing Co. and sold under the designations EC-368, EC-1099, EC-1472 and EC-1473. EC-368 and EC-1099 are designated as fast drying liquid synthetic rubber based cements, while EC-1472 and EC-1473 are polymerized epoxy resins. I have also used successfully an epoxy resin adhesive manufactured by E. I. du Pont de Nemours & Co., Inc. and sold under the designation ECD-169. I have also used successfully an epoxy resin adhesive manufactured by The Borden Chemical Co. and sold under the designation Epiphen 851 with or without a converter designated as EC8. I have also used successfully an epoxy resin adhesive manufactured by Rubber and Asbestos Corporation, of Bloomfield, N.J. and sold under the designation M-648T, with or without a converter designated as CH-16. I have also used successfully a liquid synthetic rubber based cement manufactured by Rubber and Asbestos Corporation of Bloomfield, N.J. and sold under the designation G-523.

In adhering the hemispherical shells to the center, I apply a layer of adhesive material between the outside surface of the center and the inside surfaces of the shells. For example, I coat the surface of the center, or the inside surfaces of the shells, or preferably both, with a thin layer of the adhesive, and then assemble the shells on the center by pressing them onto the center until the peripheral edges of the shells are in contact. Only light pressure is required to cause the shells to adhere tightly to the center and to each other. No heat is required, although in some cases, application of moderate heat at temperatures of from 100° to 125° F. may be desirable to hasten the dissipation of the solvents in the adhesive, or to hasten the curing of the adhesive itself. Such application of heat, however, is not used to induce plastic flow as in presently known methods, and has no deleterious effect on the rubber windings.

Example I

Ordinary commercial balata was warmed and softened by immersion in hot water and placed in a mold having a hemispherical shell cavity therein of the following dimensions: outside diameter 1.68", inside dameter 1.62". The hemispherical surface of said cavity which formed the outside surface of said shell was provided with a multiplicity of protrusions adapted to form the usual shallow depressions or "dimples" in the outside surface of said shells. The hemispherical surface of said cavity which formed the inside surface of said shell was smooth. The mold was closed and subjected to pressure to mold the shell. Two such hemspherical shells were molded. The inside surfaces of said shells were then coated with Minnesota Mining and Manufacturing Co. adhesive EC-368, which is described as a synthetic rubber based cement dissolved in a solvent. The outside surface of a golf ball center having a diameter of approximately 1.62" was also coated with the same adhesive. The adhesive was allowed to dry until the surfaces became tacky and the two shells were then placed on the center and pressed together to bring the edges of the shells into contact. The shells quickly adhered to the center and to each other. After painting the outside surface of the cover in accordance with conventional practice, the ball was ready for use.

Example II

Balata was compounded with rubber, vulcanizer and accelerators and milled as described in the Geer Patent No. 1,524,428 and placed in a hemispherical shell mold as previously described. The mold was heated to a temperature of 220° F. and the shells were subjected to heat and pressure for a period of six minutes to partially vulcanize the shells. The mold was cooled and the shells removed. Thereafter the shells were adhered to a golf ball center using Rubber and Asbestos Corporation's synthetic rubber based cement designated as G-523. The adhesive was applied to the inside surface of the shells and to the outside surface of a center. The shells and center were then allowed to stand for eight hours to allow the solvent to evaporate. The shells were then placed on the center and pressed together to bring the edges of the shells into contact. The shells quickly adhered to the center and to each other. Thereafter the cover was allowed to "air cure" at ordinary room temperature for seven days. After painting, the ball was ready for use.

Example III

Hemispherical shells made in accordance with Examples I and II were adhered to golf ball centers by using Minnesota Mining and Manufacturing Co. adhesive EC-1473 which is described as a polymerized epoxy resin containing an accelerator or converter to hasten curing. The inside surfaces of the shells were coated with the adhesive and the outside surface of the golf ball centers were also coated, after which the shells were placed on the center and pressed together to bring the edges of the shells into contact. Thereafter the covered balls were allowed to stand for a period of seven days at ordinary room temperature to allow the adhesive to cure. After painting, the balls were ready for use.

Example IV

A liquid urethane polymer manufactured and sold by E. I. du Pont de Nemours & Co., Inc. under the name Adiprene L was reacted with a diamine (designated by the name MOCA) as recommended by the manufacturer at a temperature of 212° F. and was poured into the cavity of the mold described above. The mold was closed and subjected to a temperature of 212° F. for twenty minutes. The set shell was then removed from the mold. Two such shells were made and after removal from the mold were cured by subjecting them to a temperature of 160° F. for sixteen hours. Thereafter, the shells were adhered to a golf ball center, using an epoxy resin adhesive manufactured and sold by E. I. du Pont de Nemours & Co., Inc. and designated as ECD-169. The adhesive was applied to the inside surfaces of the shells and to the outside surface of the center, as previously described. Then the two shells were placed on the center and pressed together to bring the edges into contact. Thereafter the covered balls were allowed to stand for a period of fourteen days at ordinary room temperature to allow the adhesive to cure. After painting, the balls were ready for use.

Example V

Urethane polymer shells made as described in Example IV were adhered to a golf ball center using an epoxy resin adhesive manufactured and sold by Rubber and Asbestos Corporation and designated as M-648T. Two parts, by weight of the adhesive were mixed with one part, by weight of a converter designated as CH-16. The adhesive was applied to the inside surfaces of the shells and to the outside surface of the center, as previously described. The shells were then placed on the center and pressed together to bring the edges into contact. Then, in order to hasten curing of the adhesive, the covered ball was subjected to a temperature of 100° F. for eight hours. Thereafter the covered balls were allowed to stand for a period of three days at ordinary room temperature to complete the cure. After painting, the balls were ready for use.

*Example VI*

Ordinary commercial balata was warmed and softened by immersion in hot water and placed in a mold having a hemispherical shell cavity therein of the following dimensions: outside diameter 1.68", inside diameter 1.62". Both of the hemispherical surfaces of said cavity were smooth. The mold was closed and subjected to pressure to mold the shell. Two such hemispherical shells were molded. Thereafter said shells were adhered to a golf ball center using Rubber and Asbestos Corporation's synthetic rubber based cement designated as G-523 in the manner described in Example II. After adhesion was completed, the covered ball was placed in a mold having two hemispherical mold surfaces each having a diameter of 1.68" and each having a multiplicity of protrusions adapted to form the usual shallow depressions or "dimples" in the outside surface of the cover. The mold was heated to a temperature of 160° F., and the covered ball was placed therein. The mold was then closed and the ball was subjected to heat (at 160° F.) and pressure for a period of two minutes. A slight amount of balata was exuded from the mold in the form of "flash." The mold was then cooled and the ball was removed. After paintin, the ball was ready for use.

It will be understood that the invention may be variously modified and embodied within the scope of the subjoined claims.

I claim as my invention:

1. The method of covering a golf ball by applying covering material to a spherical center having an outside layer of rubber strand wound under tension, which comprises forming two hollow hemispherical cover shells having spaced concentric inner and outer hemispherical surfaces, the outside diameters of said shells being equal to the desired outside diameter of the covered ball and the inside diameters of said shells being equal to the outside diameter of said center, applying a layer of adhesive material between the outside surface of the center and the inside sufaces of said shells, then assembling said shells on said center and adhering said shells to said center and to each other by applying pressure to the outside surfaces of said shells.

2. The method claimed in claim 1 in which said shells are formed by molding balata.

3. The method claimed in claim 1 in which said shells are formed by molding a urethan polymer reacted with a curing agent, and at least partially curing the polymer in the mold by subjecting it to heat.

4. The method claimed in claim 1 in which the adhesive in a synthetic rubber based cement.

5. The method claims in claim 1 in which the adhesive is a polymerized epoxy resin.

6. The method claimed in claim 1 in which the adhesive is applied to the inside surface of said shells and to the outside surface of said center.

7. The method of covering a golf ball by applying covering material to a spherical center having an outside layer of rubber strand wound under tension, which comprises forming two hollow hemispherical cover shells having spaced concentric inner and outer hemispherical surfaces and having a multiplicity of shallow depressions formed in the outer surfaces of said shells, the outside diameters of said shells being equal to the desired outside diameter of the covered ball and the inside diameters of said shells being equal to the outside diameter of said center, applying a layer of adhesive material between the outside surface of the center and the inside surfaces of said shells, then assembling said shells on said center and adhering said shells to said center and to each other by applying pressure to the outside surfaces of said shells.

8. The method claimed in claim 1 in which a multiplicity of shallow depressions are formed in the outside surface of said shells after said shells have been adhered to said center.

References Cited in the file of this patent

UNITED STATES PATENTS

| | | |
|---|---|---|
| 1,996,880 | Reach | Apr. 9, 1935 |
| 2,050,402 | Walsh | Aug. 11, 1936 |
| 2,455,911 | Bake | Dec. 14, 1948 |
| 2,681,096 | Semegen | June 15, 1954 |
| 2,694,694 | Greenlee | Nov. 16, 1954 |
| 2,873,790 | Cadwell et al. | Feb. 17, 1959 |

FOREIGN PATENTS

| | | |
|---|---|---|
| 315,461 | Great Britain | July 15, 1929 |